United States Patent [19]

Hamada et al.

[11] Patent Number: 4,940,618

[45] Date of Patent: Jul. 10, 1990

[54] OPTICAL INFORMATION RECORDING MEDIUM

[75] Inventors: Emiko Hamada; Yuji Arai; Yuaki Shin; Takashi Ishiguro, all of Tokyo, Japan

[73] Assignee: Taiyo Yuden Company, Ltd., Tokyo, Japan

[21] Appl. No.: 340,078

[22] Filed: Apr. 14, 1989

[30] Foreign Application Priority Data

Jul. 30, 1988 [JP] Japan .................................. 63-191715
Jul. 30, 1988 [JP] Japan .................................. 63-191716
Jan. 14, 1989 [JP] Japan ...................................... 1-7511

[51] Int. Cl.⁵ .............................................. B32B 3/02
[52] U.S. Cl. .................................. 428/64; 428/65;
428/209; 428/457; 428/913; 430/945; 369/288;
369/275.1; 346/76 L; 346/135.1
[58] Field of Search ................... 428/64, 65, 209, 457,
428/913; 430/945; 369/275, 288; 346/76 L, 135.1

[56] References Cited

U.S. PATENT DOCUMENTS 4,315,269  2/1982  Bloom et al. .
4,360,908  11/1982 Howe et al. .
4,398,203  8/1983  Cornet .
4,404,656  9/1983  Cornet .
4,405,994  9/1983  Cornet et al. .
4,577,291  3/1986  Cornet .
4,586,165  4/1986  Cornet et al. .

FOREIGN PATENT DOCUMENTS 103892  3/1984  European Pat. Off. .
2079031  1/1982  United Kingdom .

Primary Examiner—Patrick Ryan
Attorney, Agent, or Firm—Oblon, Spivak, McClelland, Maier & Neustadt

[57] ABSTRACT

An optical information recording medium of the type wherein recorded data signals are reproduced by scanning them with a laser beam. The medium comprises a ROM region where optically readable pits are already formed and an information recordable region where optically readable pits can be formed by irradiation with a writing laser beam. The infomation recordable region comprises a light transmitting substrate having a deformable surface, a light absorptive layer overlaying the deformable surface, which absorbs the writing laser beam, and a light reflective layer overlaying the light absorptive layer. The deformable surface is deformable by energy generated upon absorption of the writing laser beam by the light absorptive layer, to thereby form optically readable pits.

8 Claims, 3 Drawing Sheets

OPTICAL INFORMATION RECORDING MEDIUM

The present invention relates to an optical information recording medium of the type wherein recorded data are reproduced by scanning them by a laser beam. More particularly, it relates to an optical information recording medium comprising a ROM region where data are already recorded and an information recordable region where data can be recorded.

Conventional so-called writable optical information recording media capable of recording data by means of laser beams, have a recording layer of e.g. a metal such as Te, Bi or Mn or a dye such as cyanine, merocyanine or phthalocyanine, and are designed to record data in such a manner that when irradiated with a laser beam, such recording layer is deformed, sublimed, evaporated or modified to form pits. With optical information recording media having such a recording layer, it is common to form a space behind the recording layer to facilitate the deformation, sublimation, evaporation or modification of the recording layer for the formation of the pits. A typical example is a laminated structure so-called an air sandwich structure wherein a pair of substrates are laminated with a space therebetween.

With the optical information recording media of this type, a writing laser beam is irradiated through a transparent substrate to form optically readable pits in the recording layer. For reproducing the recorded data, a reading laser beam having less power than the writing laser beam is irradiated through the substrate, and the contrast between the light reflected from the pits and the light reflected from non-pitted portion is read as an electrical signal.

On the other hand, optical information recording media of the so-called ROM (read only memory) type wherein data are already recorded, and no further data are recordable or the recorded data are no longer erasable or rewritable, are widely practically employed in the sound recording and information treating fields. Optical information recording media of this type have no such recording layer as described above. Prepits or pregrooves corresponding to data to be reproduced are already formed on a substrate of e.g. polycarbonate by e.g. press molding, a reflective layer of a metal such as Au, Ag, Cu or Al is formed thereon, and a protective layer is further provided thereon.

The most typical optical information recording medium of this ROM type is a compact disc or so-called CD which is widely used in the sound recording and information treating fields. The specifications for recording and reading-out signals for this CD is standardized, and the reproducing or play back apparatus for CD, in accordance with this standard, is widely available as compact disc players (CD players).

The above-mentioned optical information recording media all take a disc form having a center hole for engagement with a rotatory shaft, i.e. a form of an optical disc.

Heretofore, such recordable optical information recording media and ROM type optical information recording media have been available as separate media independently.

ROM type optical information recording media have a merit in that media having the same data can be produced in a large quantity, and the recorded data will not be erased inadvertently. However, the user can not record optional data thereon.

On the other hand, in the case of recordable optical information recording media, the user can record any optional data thereon. However, such recording media are not suitable for recording the same data in a large quantity, and they also have a drawback in that the recorded data may inadvertently be erased.

In view of these respective characteristics, their uses are naturally different from each other. Thus, conventional optical information recording media are restricted in use for one of the two types of applications.

Under the circumstances, it is an object of the present invention to solve such conventional problems and to provide an optical information recording medium having both a recordable region and a ROM region.

Namely, the present invention provides an optical information recording medium of the type wherein recorded data are reproduced by scanning them with a laser beam, which comprises a ROM region where optically readable pits are already formed and an information recordable region where optically readable pits can be formed by irradiation with a writing laser beam, wherein the information recordable region comprises a light transmitting substrate having a deformable surface, a light absorptive layer overlaying the deformable surface, to absorb the writing laser beam, and a light reflective layer overlaying the light absorptive layer, said deformable surface being deformable by energy generated upon absorption of the writing laser beam by the light absorptive layer, to form optically readable pits.

The optical information recording medium of the present invention has an information recordable region and a ROM region on a single substrate, whereby in the ROM region, the same data can be recorded in a large quantity by e.g. press molding and there is no danger of inadvertent erasure of the recorded data, and in the recordable region, any desired data may be recorded at will by the user.

Further, in a case where a light absorptive layer is formed on the substrate by coating, such a light absorptive layer may be formed to fill up the pregroove formed preliminarily on the substrate, so that the attenuation of light due to interference of the light reflected from the pregroove and the light reflected from the land will be suppressed, whereby the reflectance for reproduction at the pregroove portion will be high, and the degree of modulation of pits formed in the information recordable region can be made high. Thus, the read-out signals from the pits formed in the information recordable region and the read-out signals from the prepits on the substrate will both have adequate degrees of modulation.

Now, the preferred embodiments of the present invention will be described in detail with reference to the drawings, in which:

BRIEF DESCRIPTION OF DRAWINGS

FIGS. 1 to 3 diagrammatically illustrate a structure of the optical information recording medium according to the present invention. In these Figures, reference numeral 1 indicates a light transmitting substrate, and numeral 2 indicates a light absorptive layer formed thereon, which generates heat upon absorption of an irradiated laser beam and is thereby melted, evaporated, sublimed, deformed or modified to form pits on the surface of the substrate 1 or in the light absorptive layer 2. Reference numeral 3 is a light reflective layer formed thereon, and numeral 4 indicates a protective layer provided thereon.

Figure 1:
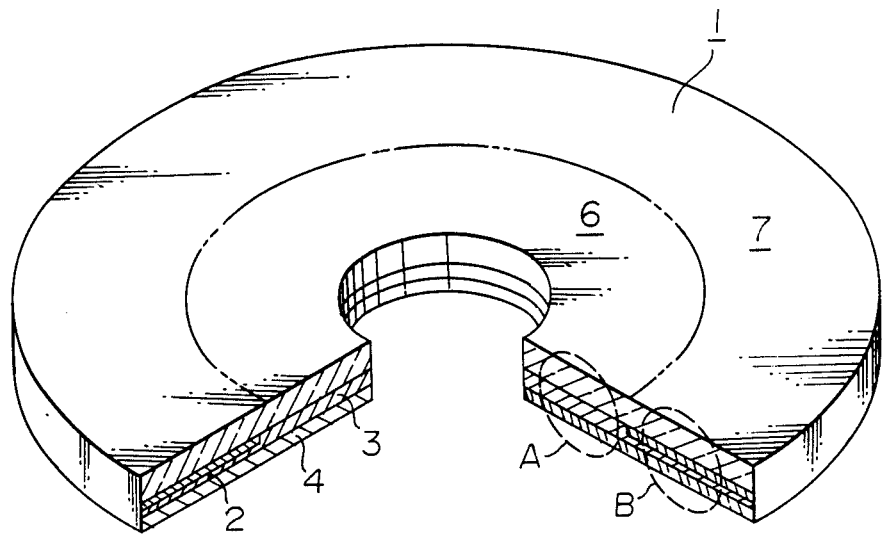
FIG. 1 is a partially cross-sectional perspective view diagrammatically illustrating one embodiment of the structure of the optical information recording medium of the present invention.
Figure 2:
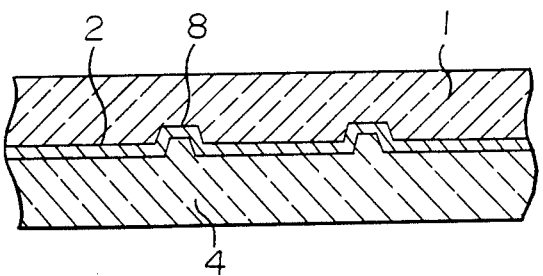
FIG. 2 is an enlarged view of portion A of FIG. 1.
Figure 3:
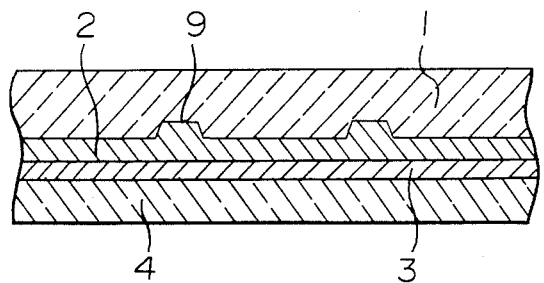
FIG. 3 is an enlarged view of portion B of FIG. 1.

The light transmitting substrate 1 is made of a material having high transparency to laser beams and is usually made of a resin having excellent strength such as a polycarbonate, an acrylate resin or an epoxy resin. However, the substrate may be made of any other material so long as it is transparent to writing and reading laser beams and at least the surface layer adjacent to the light absorptive layer 2 in the information recordable region 7 is deformable by energy generated by the light absorptive layer upon absorption of the writing laser beam, to form optically readable pits. In this respect, the substrate or at least the surface layer thereof preferably has a heat distortion temperature within a range of from 85° to 200° C., more preferably from 90° to 150° C., as measured in accordance with ASTM D648 under a load of 4.6 kg cm$^2$ and/or a Rockwell hardness within a range of from M200 to M75, more preferably from M105 to M80, as measured in accordance with ASTM D785. When the heat distortion temperature or the Rockwell hardness of the substrate is within the above-mentioned range, the energy generated by the light absorptive layer 2 upon absorption of the writing laser beam can effectively be absorbed by the local deformation of the surface layer of the substrate 1 so that no substantial strain will remain in the formed pits, whereby the stability of the recorded data will be secured. If the heat deformation temperature or the hardness is too low, the formed pits will tend to be easily deformed by heat or external force, whereby the stability will be poor. On the other hand, if the heat distortion temperature or the hardness is too high, the energy generated by the light absorptive layer 2 can hardly be absorbed in the form of deformation of the substrate 1, and it is difficult to form distinct pits 5, whereby it will be difficult to obtain read-out signals having a high degree of modulation.

The thickness of the substrate 1 is not critical, but it is usually within a range of from 1.1 to 1.5 mm.

The light absorptive layer 2 in the information recordable region 7 is a layer which absorbs a laser beam entered through the light transmitting substrate 1, whereupon it generates heat and at the same time undergoes melting, evaporation, sublimation, reaction, decomposition or modification. It is formed usually by spin coating a dye material such as a cyanine dye on the substrate 1. The light absorptive layer 2 may be formed to cover also the ROM region 6.

The thickness of the light absorptive layer 2 is usually within a range of from 20 to 500 nm, preferably from 100 to 300 nm.

The light reflective layer 3 is usually made of a metal such as gold, silver, copper, aluminum or an alloy thereof. The thickness of the light reflective layer 3 is usually within a range of from 30 to 150 nm, preferably from 40 to 130 nm.

The protective layer 4 is made of a resin excellent in the impact resistance like the light transmitting substrate 1 and is most commonly formed by coating a ultraviolet curable resin by spin coating, followed by irradiation with ultraviolet rays for curing. Other materials such as an epoxy resin, an acrylate resin and a silicone hard coat resin may also be used. It is also possible to employ a resilient material such as a urethane resin to obtain a cushion effect.

The thickness of the protective layer 4 is not critical and is usually within a range of from 3 to 30 μm, preferably from 5 to 15 μm.

Now, specific Examples of this structure will be described.

EXAMPLE 1

A polycarbonate substrate 1 of a disc shape having a thickness of 1.2 mm, an outer diameter of 120 mm and an inner diameter of 15 mm and having a spiral prepit 8 capable of reproducing CD format signals formed with a width of 0.6 μm, a depth of 0.08 μm and a pitch of 1.6 μm in a range (ROM region 6) of the diameter of from 46 to 80 mm and having a spiral pregroove 9 (tracking guide groove) formed with a width of 0.8 μm, a depth of 0.08 μm and a pitch of 1.6 μm in a range (information recordable region 7) of the diameter of 80 to 117 mm outside the ROM region 6, was formed by injection molding.

As an organic dye to form the light absorptive layer, 0.65 g of 1,1'-dibutyl 3,3,3',3'-tetramethyl-4,5,4',5'-dibenzoindodicarbocyanine perchlorate (product number NK3219, manufactured by Nippon Kanko Shikiso K.K.) was dissolved in 10 ml of a diacetone alcohol solvent. The solution was coated by spin coating on the surface of the portion corresponding to the outer region of the substrate 1, i.e. the information recordable region 7 outside the diameter of 80 mm, to form a light absorptive layer 2 of a light sensitive dye film having a thickness of 0.13 μm.

Figure 5:
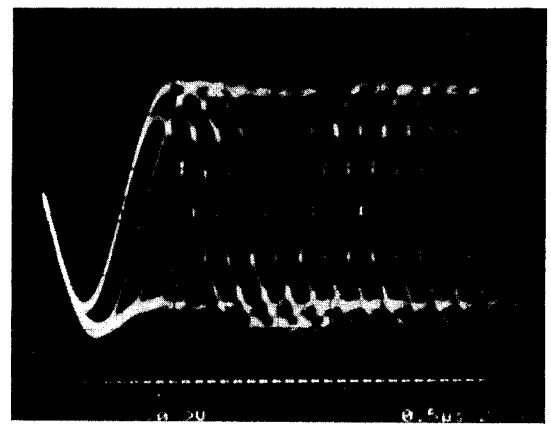
FIGS. 5 to 7 are waveform views showing output waveforms obtained by playing back optical discs prepared in Examples by a commercially available CD player.
Figure 6:
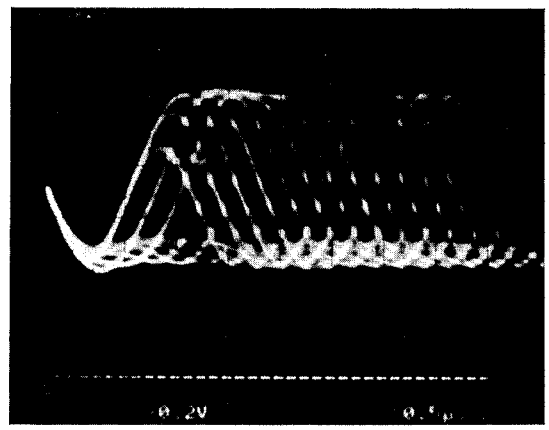

Then, a gold film having a thickness of 400 Å was formed by sputtering over the entire surface of a region of the diameter of from 45 to 118 mm of this disc, to form a light reflective layer 3. An ultraviolet curable resin was further spin-coated on this light reflective layer 3 and cured by irradiation with ultraviolet rays to form a protective layer 4 having a thickness of 10 μm. To the information recordable region 7 of the optical disc thus obtained, a semiconductor laser beam having a wavelength of 780 nm was irradiated at a linear speed of 1.2 m/sec with a recording power of 6.0 mW to record EFM signals. Then, this optical disc was played back by a commercially available CD player (Aurex XR-V73, wavelength of the reading laser beam λ=780 nm), whereby the waveform of the read out signals obtained from the inside ROM region 6 was as shown in FIG. 5, and in this region, the reflectance of the semiconductor laser beam was 85%, $I_{11}/I_{top}$ was 0.7 and $I_3/I_{top}$ was 0.47. Further, the waveform of the read-out signals obtained from the outside information recordable region 7 was as shown in FIG. 6, and in this region, the reflectance of the semiconductor laser beam was 72%, $I_{11}/I_{top}$ was 0.65 and $I_3/I_{top}$ was 0.35.

The CD standards prescribe that the reflectance is at least 70%, $I_{11}/I_{top}$ is at least 0.6 and $I_3/I_{top}$ is from 0.3 to 0.7. The optical disc of this example meets these standards with both the ROM region and the information recordable region.

EXAMPLE 2

A polycarbonate substrate 1 of a disc shape having a thickness of 1.2 mm, an outer diameter of 120 mm and an inner diameter of 15 mm and having a spiral prepit 8 capable of reproducing CD format signals formed with a width of 0.6 μm, a depth of 0.08 μm and a pitch of 1.6 μm in a range (ROM region 6) of the diameter of from 46 to 100 mm and having a spiral pregroove 9 formed with a width of 0.6 μm, a depth of 0.08 μm and a pitch of 1.6 μm in a range (information recordable region 7) of the diameter of from 100 to 117 mm outside the ROM region 6, was formed by injection molding.

The portion inward from the diameter of 100 mm of the substrate, i.e. the ROM region 6, was masked, and a GaAs film having a thickness of 900 Å was formed by sputtering on the outer circumferential portion, i.e. the information recordable region 7, to form a light absorptive layer 2.

A gold film having a thickness of 400 Å was formed by sputtering on the entire surface of a region of the diameter of from 45 to 118 mm of this disc, to form a light reflective layer 3.

Figure 7:
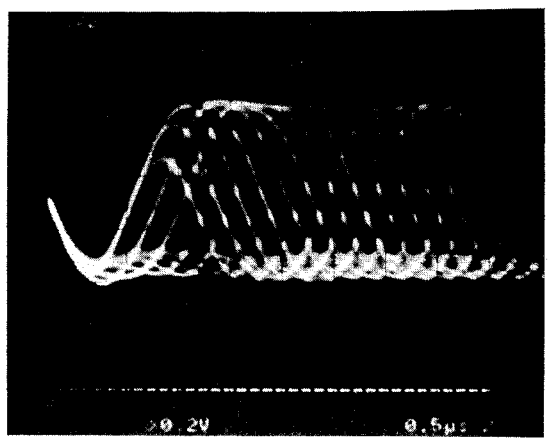

To the information recordable region 7 of the optical disc thus obtained, a semiconductor laser beam having a wavelength of 780 nm was irradiated at a linear speed of 1.2 m/sec with a recording power of 6.0 mW to record EFM signals. Then, this optical disc was played back by the same CD player as used in Example 1, whereby the waveform of the read-out signals obtained from the inside ROM region 6 was as shown in FIG. 5, and in this region, the reflectance of the semiconductor laser beam was 85%, $I_{11}/I_{top}$ was 0.7 and $I_3/I_{top}$ was 0.47. Further, the Waveform of the read-out signals obtained from the outside information recordable region 7 was as shown in FIG. 7, and in this region, the reflectance of the semiconductor laser beam was 76%, $I_{11}/I_{top}$ was 0.65 and $I_3/I_{top}$ was 0.35.

The CD standards prescribe that the reflectance is at least 70%, $I_{11}/I_{top}$ is at least 0.6 and $I_3/I_{top}$ is from 0.3 to 0.7. The Optical disc of this example meets the standards with both the ROM region and the information recordable region.

EXAMPLE 3

A polycarbonate substrate 1 of a disc shape having a thickness of 1.2 mm, an outer diameter of 120 mm and an inner diameter of 15 mm and having a spiral prepit 8 capable of reproducing CD format signals formed with a width of 0.5 μm, a depth of 0.08 μm and a pitch of 1.6 μm in ranges (ROM regions 6) of the diameters of from 46 to 70 mm and from 85 to 102 mm and having a spiral pregroove 9 formed with a width of 0.6 μm, a depth of 0.08 μm and a pitch of 1.6 μm in ranges (information recordable regions 7) of the diameter of from 70 to 85 mm therebetween and from 102 to 117 mm outside thereof, was formed by injection molding.

The portions corresponding to the ranges of the diameter of from 46 to 70 mm and from 85 to 102 mm, i.e. the ROM regions 6, were masked, and a GaAs film having a thickness of 900 Å was formed on the remaining portion i.e. the information recordable region 7, to form a light absorptive layer 2.

A gold film having a thickness of 400 Å was formed by sputtering on the entire surface of a region of the diameter of from 45 to 118 mm of this disc, to form a light reflective layer 3.

To the information recordable regions 7 of the optical disc thus obtained, a semiconductor laser beam having a wavelength of 780 nm was irradiated at a linear speed of 1.2 m/sec with a recording power of 6.0 mW, to record EFM signals. Then, this optical disc was played back by the same CD player as used in Example 1, whereby the waveforms of the read-out signals, the reflectance of the semiconductor laser beam, $I_{11}/I_{top}$ and $I_3/I_{top}$ in both the inside ROM regions 6 and the information recordable regions 7, were substantially the same as in Example 2.

In conventional information recording media, it is common that a shock absorbing portion, such as a space, be formed behind the information recordable layer so that when the recording layer absorbs a laser beam and generates heat and is thereby melted, evaporated, sublimed, deformed or modified, such thermal changes are absorbed by the above shock absorbing portion, whereby pits are formed to the recording layer itself. Whereas, the optical information recording medium of the present invention has a light reflective layer 3 behind the light absorptive layer 2 and a protective layer 4 behind the light reflective layer 3, and by forming the layers behind the light absorptive layer 2 with materials more hardly heat-deformable than the substrate 1, it is possible to employ a recording system wherein the thermal changes of the light absorptive layer 2 are absorbed by the substrate 1 so that optically modified pits such as protuberances, waved pits or dents will be formed on the substrate.

Figure 4:
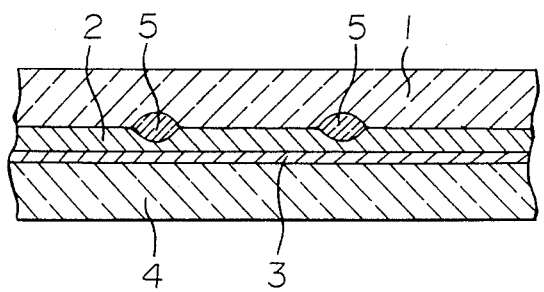
FIG. 4 is a diagrammatical cross-sectional view of another embodiment of portion B after recording.

For example, in the above Example 1, the polycarbonate substrate 1 had a Rockwell hardness (ASTM D785) of M75 and a heat distortion temperature (ASTM D648) of 132° C. under a load of 4.6 kg/cm². Whereas, after curing the protective layer 4 had a Rockwell hardness (ASTM D785) of M90 and a heat distortion temperation (ASTM D648) of 150° C. under a load of 4.6 kg/cm². Namely, in the optical information recording medium of this Example, the protective layer 4 behind the light absorptive layer 2 is made of a material more hardly heat-deformable than the substrate, whereby the thermal changes of the light absorptive layer 2 are absorbed by the surface of the substrate 1 and pits in the form of protuberances are formed on the surface of the substrate. Thus, as shown diagrammatically in FIG. 4, after the recording, pits 5 in the form of protuberances are observed on the surface of the substrate 1 of the optical disc which is in contact with the light absorptive layer 2.

As described in the foregoing, the optical information recording medium of the present invention has a ROM region and an information recordable region on the same medium, whereby in the ROM region, data can be recorded in a large quantity and the recorded data can be reproduced without inadvertent erasure, and at the same time, in the information recordable region, the user can record any optional data. Thus, the optical information recording medium of the present invention is useful for wide a range of applications.

What is claimed is:

1. An optical information recording medium of the type wherein recorded data are reproduced by scanning them with a laser beam, which comprises a ROM region where optically readable pits are already formed and an information recordable region where optically readable pits can be formed by irradiation with a writing laser beam, wherein the information recordable region comprises a light transmitting substrate having a deformable surface, a light absorptive layer overlaying the deformable surface, to absorb the writing laser beam, and a light reflective layer overlaying the light absorptive layer, said deformable surface being deformable by energy generated upon absorption of the writing laser beam by the light absorptive layer, to form optically readable pits.

2. The optical information recording medium according to claim 1, wherein the light transmitting substrate has a heat distortion temperature within a range of from 85° to 200° C. as measured in accordance with ASTM D648 under a load of 4.6 kg/cm$^2$.

3. The optical information recording medium according to claim 1, wherein the light transmitting substrate has a Rockwell hardness within a range of from M200 to M75 as measured in accordance with ASTM D785.

4. The optical information recording medium according to claim 1, wherein the light transmitting substrate is made of a polycarbonate resin, an acrylate resin or an epoxy resin.

5. The optical information recording medium according to claim 1, wherein the light absorptive layer contains a cyanine dye.

6. The optical information recording medium according to claim 1, wherein the reflective layer is made of gold, silver, copper, aluminum or an alloy thereof.

7. The optical information recording medium according to claim 1, wherein the deformable surface layer of the light transmitting substrate has a tracking guide groove in which said optically readable pits are to be formed.

8. The optical information recording medium according to claim 1, wherein a protective layer is provided as a top layer.

* * * * *